United States Patent [19]

Hyll

[11] Patent Number: 4,732,541
[45] Date of Patent: Mar. 22, 1988

[54] CENTRIFUGAL ELASTOMERIC COATED IMPELLERS

[75] Inventor: John Hyll, Salt Lake City, Utah

[73] Assignee: Baker International Corporation, Orange, Calif.

[21] Appl. No.: 845,976

[22] Filed: Mar. 31, 1986

Related U.S. Application Data

[62] Division of Ser. No. 743,067, Jun. 10, 1985, Pat. No. 4,706,928.

[51] Int. Cl.⁴ ............................................. F04D 29/22
[52] U.S. Cl. ................................ 416/186 R; 416/224; 416/241 A
[58] Field of Search ............... 416/213 A, 224, 229 R, 416/186 R, 241 A; 415/212 R, 214, 215

[56] References Cited

U.S. PATENT DOCUMENTS

| | | | |
|---|---|---|---|
| 1,825,622 | 9/1931 | Kennedy | 416/189 R X |
| 2,440,317 | 4/1948 | Welsh | 416/224 X |
| 2,625,884 | 1/1953 | Welsh | 416/229 X |
| 2,710,580 | 6/1955 | Holzwarth. | |
| 2,882,829 | 4/1959 | Wade | 416/189 R |
| 3,155,045 | 11/1964 | Lown et al. | 416/224 X |
| 3,189,671 | 6/1965 | Babb | 415/214 X |
| 3,272,129 | 9/1966 | Leopold | 416/183 X |
| 3,398,866 | 8/1968 | La Flame et al. | 415/213 R X |
| 3,551,067 | 12/1970 | Wissman | 416/241 A X |
| 4,355,954 | 10/1982 | Wilson | 416/183 X |
| 4,634,344 | 1/1987 | Zagar et al. | 416/175 |

FOREIGN PATENT DOCUMENTS

| | | | |
|---|---|---|---|
| 1806757 | 5/1970 | Fed. Rep. of Germany. | |
| 275923 | 9/1951 | Switzerland | 416/186 R |
| 284885 | 12/1952 | Switzerland | 416/223 B |
| 394012 | 6/1933 | United Kingdom | 416/213 A |

Primary Examiner—Everette A. Powell, Jr.
Attorney, Agent, or Firm—Trask, Britt & Rossa

[57] ABSTRACT

An elastomeric-covered shrouded impeller having a pair of disk-like shrouds enclosing vanes and vane passages which has an improved throat opening having sweeping internal sidewalls is disclosed. A three-piece mold core is utilized to form the vane passage and the sweeping curved throat inlet of the impeller.

8 Claims, 23 Drawing Figures

CENTRIFUGAL ELASTOMERIC COATED IMPELLERS

This is a division of application Ser. No. 743,067, filed June 10, 1985, now U.S. Pat. No. 4,706,928.

BACKGROUND OF INVENTION

1. Field

The instant invention relates to elastomeric-covered shrouded impellers for centrifugal pumps.

2. Prior Art

Shrouded impellers in which the vanes and vane passages are enclosed between a pair of opposed shrouds or disks are relatively commonplace in centrifugal pumps. Shrouded impellers are available in both metal and elastomer-covered metal constructions. Metal impellers are typically utilized in non-abrasive, non-corrosive environments. Elastomer-covered impellers, because of expense and difficulty in making same, are typically utilized only where abrasive or corrosive resistance is required, for example, in slurry pumps handling abrasive or gritty solids in a liquid media or in dealing with corrosive liquids such as acids and the like.

An elastomeric-covered impeller is formed about a metal insert. The technique involves placing the metal insert within a mold and providing core elements which provide for the voids within the impeller after molding. Elastomeric material is forced generally under pressure into the molds so that those spaces which exist between the metal insert and the core elements are filled with rubber thereby forming the elastomeric-covered shrouded impeller.

Figure 1:
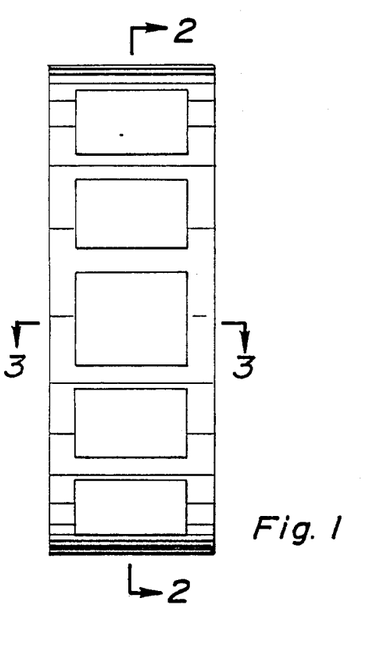
FIG. 1 is an elevational view of the peripheral exterior of a conventional elastomeric covered impeller.

A typical rubber-covered impeller is shown in FIG. 1 in an elevational view showing the peripheral edge of the impeller with vane passage openings shown at the periphery. The formation of the throat opening and vane passages in the molding process is relatively straight-forward in this type of construction.

Figure 2:
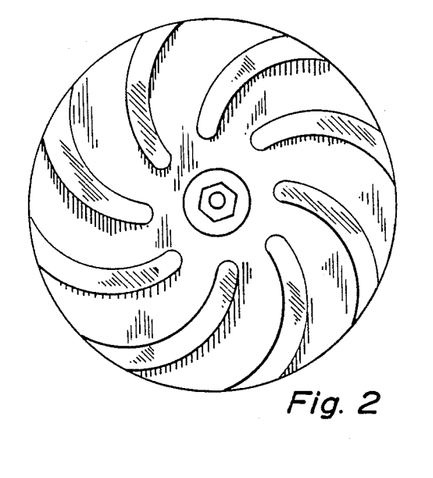
FIG. 2 is a cross-sectional view of the impeller of FIG. 1 along section lines 2—2 illustrating the curved vanes and vane passages.

An elevational view of the vanes of a shrouded impeller along section lines 2—2 of FIG. 1, is illustrated in FIG. 2. The spacing between adjacent vanes is closer near the center of the impeller than around the outer edges of the vanes. In the orientation of the impeller illustrated in FIG. 2, the rotation of the impeller is counter-clockwise.

Figures 3, 4:
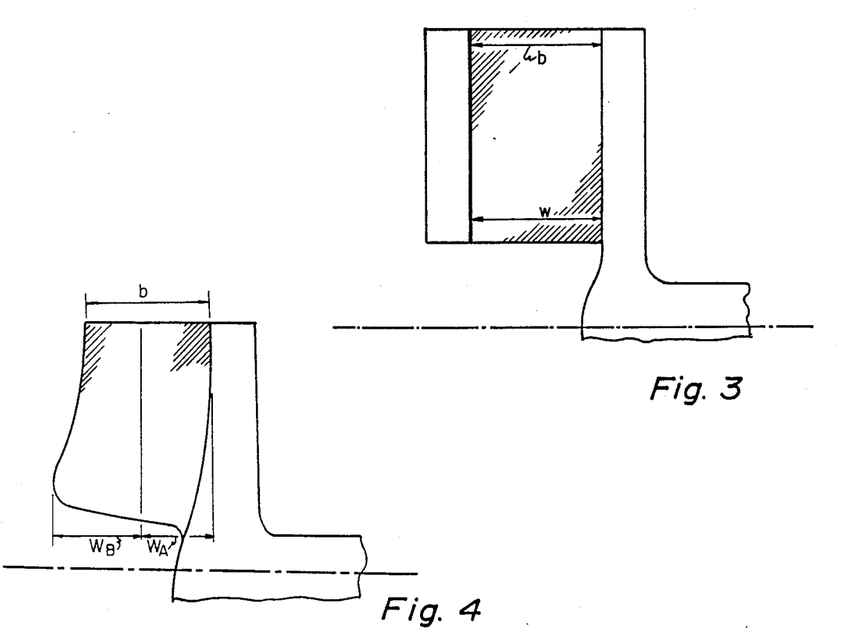
FIG. 3 is a cross-sectional view of the impeller of FIG. 1, along section lines 3—3 illustrating the flow channel from the inlet throat to the vane passage.
FIG. 4 is a cross-sectional view similar to FIG. 3 of an impeller having slightly curved shroud walls to provide an improved flow channel from the inlet throat to the vane passage.

In the arrangement illustrated in FIG. 3, the vane core, which is a portion of the mold which forms the vane passage, has a uniform width "w" between the inner walls of the front and rear shroud. For the purposes of description herein of shrouded impellers, the front shroud is the shroud containing the inlet opening in the throat of the impeller. Thus, the vane core may be easily extracted by a force perpendicular to the central axis of the impeller.

A slight variation to the arrangement illustrated in FIG. 3 is that illustrated in FIG. 4 which is another prior art arrangement. The illustrated of FIG. 4 shows some curvature of the inner walls of the front and rear shrouds. This wall curvature is to provide a flow channel from the inlet throat of the impeller into the vane passage which provides a gradual change of direction to accomplish the 90° change of direction from axial inlet flow to radial outlet flow. The vane passage of the impeller of FIG. 4 is formed by a pair of vane core members, A and B, whereby, the width $W_A$ and width $W_B$ of each core member is smaller than the width "b" of the peripheral vane passage width. Extraction of these core members is perpendicular to the central axis of the impeller and is in the order of core "A" being first removed and then core "B" being later removed.

In metal impellers with enclosed vanes the formation of shrouds with curved inner walls has been practiced for quite some time. Metal impellers are generally formed by sand casting, whereby, the formation of curved interior walls of the forward and rear shrouds has been easily achieved since solid core members are not used in the casting process. Thus, the achievement of a channel connecting the inlet throat with the vane passage in a manner such that the channel encounters no sharp angle restrictions has been long practiced with metal impellers.

The presence of a right-angle corner such as that present in the construction illustrated in FIG. 3, may cause velocity loss as well as turbulence near the square corner and cause erosion of the elastomeric covering on the back shroud in the area directly opposite to the square corner on the front shroud.

SUMMARY OF THE INVENTION

A unique elastomeric-covered shrouded impeller having a pair of disk-like shrouds enclosing vanes and vane passage with an improved throat opening has been invented. The throat opening into a particular vane passage is formed between a front disk-like shroud which has a sweeping internal sidewall and a rear disk-like shroud having a conical projection at its center to form a curved channel which interconnects the inlet opening of the impeller with each vane passage so as to introduce axial inlet flow into the right angle peripheral flow in the vane passages with a minimum eddying effect.

The invention further involves a vane core mold assembly comprising at least three vane core members to form a vane passage which has a non-uniform width between the interior walls of the front and rear shroud and particularly where the width adjacent the inlet portion of the impeller is substantially greater, often about twice as great or more, than the width of the vane passage opening at its peripheral edge between the front and rear shrouds. The vane passage also has a non-uniform spacing between adjacent vanes whereby the opening at the peripheral edge of the impeller is significantly greater between adjacent vanes than the opening between adjacent vanes near the inlet.

Thus, in the instant invention the vane passage is a very irregular void, having a lateral width near the center of the impeller which is much greater than the lateral width (lateral width being the perpendicular distance between the front and rear shrouds) near the periphrey of the shrouds while the circumferential spacing between adjacent vanes is exactly the opposite with the greater distance between adjacent vanes occurring at the periphery of the shrouds and a narrow spacing between adjacent vanes occurring near the center of the impeller.

To accommodate the irregular three-dimensional vane passage, the vane core elements are structured to be removed along an extraction surface between adjacent cores perpendicular to and away from the central axis of the impeller. The core elements are flat members which are curved along opposed edges to conform (and to form) the curved vanes. The curvatures along opposed surfaces of adjacent vanes which form a vane passage are mating surfaces so that the vane core members, as illustrated hereinafter, may be removed along an extraction path, as viewed from the face of the impeller, which is an arc. Generally, two of the vane core elements extend substantially the whole distance from the periphery of the vane passage to the inlet portion of the vane passage. Generally, the third vane core element does not extend the full radial distance of the vane passage.

DETAILED DESCRIPTION OF THE PREFERRED EMBODIMENT

The instant invention involves a unique construction of shrouded, elastomeric-covered impellers generally 2. Such impellers come in particularly small sizes, for example, less than about 12 inches in diameter, and are provided with a channel comprising the inlet throat and the vane passage which is essentially curvalinear. Fluid entering the pump enters axially through an opening in the front shroud and, through the centrifugal action of the pump, parts in a direction perpendicular to the original axial flow. The change of direction for fluids in the instant impellers is very gradual and distinctly different from that in existing elastomeric-covered, enclosed impellers.

Theoretically, the curvature of the flow channel formed by the throat (inlet opening) through the vane passage to the peripheral exit for the impeller would ideally be a 90° arc of a circle. Such a construction would, of course, involve an impeller axial depth which was greater than about one-half the impeller diameter. While casting of metal impellers approximating such a construction in sacrificial molds is relatively straightforward, molding complexities are encountered in making a comparable elastomeric-covered shrouded impeller.

In the instant invention, a mold assembly involving a mold casing 4 a central core member and a vane core mold assembly of at least three elements is utilized to approximate an ideal flow channel from inlet to discharge for an elastomeric-covered shrouded impeller for a centrifugal pump.

The technique for making the impellers of this invention and the multiple-element, vane core mold assembly for forming the sweeping channel connecting the throad and vane passage is unique. Further description of the instant invention may be facilitated by reference to the attached drawings.

Figure 5:
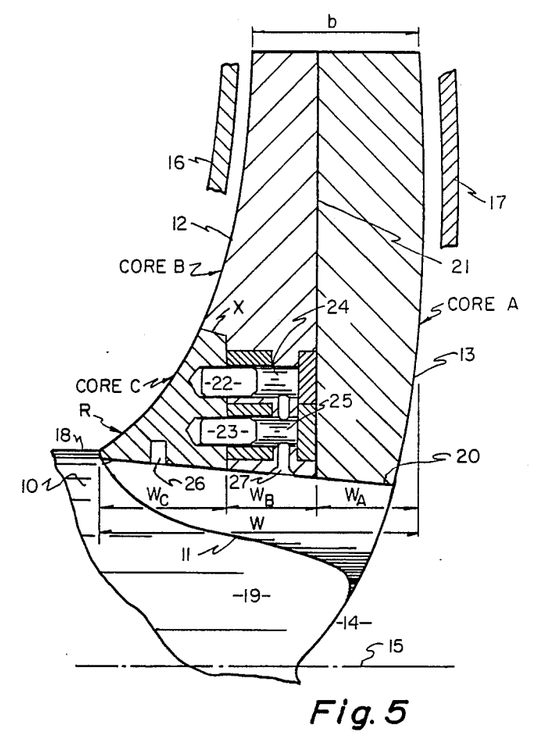
FIG. 5 is a cross-sectional view similar to FIG. 3 of an impeller of the instant invention having radially curved shroud walls forming the vane passage and a cross-sectional view of the core assembly used to form the vane passage.

The unique channel arrangement associated with the instant invention is illustrated in FIG. 5. The throat inlet 10 connects to the vane passage, which in FIG. 5 is occupied by vane core mold members in molding the appropriately shaped vane passage. As illustrated, in FIG. 5, a very gradual change of directions occurs between fluid entering the throat and then changing directions at 90° to exit the vane core passage at the peripheral edge of the impeller.

The vane core passage 11 is formed between the front shroud interior wall 12 and the interior wall 13 of the rear shroud. The curved surface of the rear shroud 13 continues below the vane core passage 11 to form a cone-shaped projection 14 with its apex at the central axis of the impeller 15. A steel impeller skeleton 16 is first placed in the mold before rubber is injected. In FIG. 5, the steel skeleton shroud members 16A and 17B, respectively, form the front and rear shroud inserts about which the elastomer forms to form the elastomeric-covered impeller shrouds.

The interior wall of the front shroud adjacent to the throat inlet has a curvature as established by radius R. Radius R is generally determined by the diameter of the impeller and the amount of sweep desired. Furthermore, the curvature of the interior wall of the front shroud may be described by several different radii having different focal points.

The juncture of the inner wall 12 of the front shroud with the throat inlet wall 18 approximates a curvalinear relationship, that is the curvature of the inner shroud wall 12 is such that the throat inlet wall 18 is substantially tangential to the curved wall 12 at the point of juncture.

The interior wall 13 of the rear shroud has a curvature such that at the apex of the cone 14 the curvature of the cone wall is such that an extension of such curved wall joins with the central axis 15 of the impeller in a curvalinear fashion, that is, the axis is substantially tangential to the extended curve of the curved wall of cone 14.

The center core plug 19 is substantially cylindrical in shape at the throat inlet area and has longitudinal grooves circumferentially spaced equidistantly about the plug near the distal end. These grooves accommodate the formation of extensions of the vanes into the inlet throat and are dished on the end to form the conical projection 14. The center core plug mates with vane core elements A B and C at boundary or parting surface 20. Vane core member A joins at parting line 21 with vane core member B. Parting line 21 is, in fact, a planar surface as illustrated in other drawings, and is substantially perpendicular to the central axis 15. Vane core member "A" has a maximum width $W_A$, which must not be greater than its width at the exit of the vane passage. Since the extraction of the core is in a direction perpendicular to the central axis 15 no thickness of any core member can exceed with width of the core member at its exit point. The width of $W_A$ must, of course, be less than the width of the exit as illustrated by letter "b". Preferably, the width $W_A$ is significantly less than the exit width "b". The second vane core member B should have a sufficient thickness near its exit to be sufficiently durable that it is not easily broken. For example, if core member A were substantially as thick as exit width b then core member B may be substantially a knife edge at its upper portions and, therefore, would be easily broken.

In the core mold arrangement illustrated in FIG. 5, the width of W which is the combined widths of core members A, B and C, is greater than the exit width "b". In the case of core member B of the width $W_B$ is not the maximum width of the element, however, the maximum width of core member B, which is near shoulder "X", must be smaller than the exit width "b". Core members B and C are formed with a shoulder "X" so that again a silver or knife edge is not required on core member C. Structuring core member C such that it is recessed slightly into core member B makes core member C an easier part to fabricate and assures a better seal at the sealing surfaces between core members so that the mold surface presented to form interior wall 12 is a continuous surface. Core member C and core member B are joined together by pins projecting from core member C which are recessed within bores in core member B. Conversely, the pins could be affixed to core member B and the bores recessed within core member C. Since the surfaces at the joint between core members B and C are generally machined surfaces the parts may tend to stick together after being subjected to the pressures within the mold during injection of the elastomeric rubber material. A pry slot 26 is provided for insertion of a screw driver or the like, to pry the cores B and C apart. Also air injection port 27 is provided in core member B so that air pressure may be introduced into bores 24 and 25 to eject pins 22 and 23 to separate cores C and B. Pry slot 26 and air injection port 27 are at a boundary surface between cores B and C and the center core plug so that the elastomer in liquid form 27, as it is filling the mold, cannot reach the slot 26 or port 27, so that these remain open and unfilled with rubber.

Figure 6:
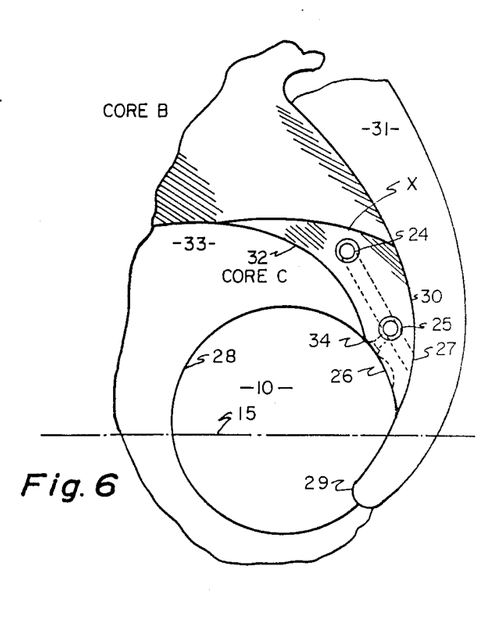
FIG. 6 is an elevational view of the vane core assembly member of the instant invention.

A frontal or elevational view of core member C is illustrated in FIG. 6. Core C has a substantially crescent shape; the central circle 28 illustrated the cylindrical wall of throat 10. FIG. 6 illustrates the central core plug 19 positioned in place with grooves 29 in the distal cylindrical surface of the plug spaced so as to form the interior tips of the vanes which protrude into the throat region. Thus, core member C at surface 30 forms a portion of the surface of a vane 31 while the surface 32 of the core C forms a surface of a vane 33. The juncture line "X" is illustrated showing a juncture surface between core B and core C. Surface 34 is the parting surface formed between core C and the central core plug 19. Pry slot 26 is shown in dotted lines as is injection port 27 which interconnects bores 24 and 25.

FIGS. 7, 8, 9 and 10 illustrate sequentially the removal of vane core members A, B and C and central core plug 19.

Figure 7:
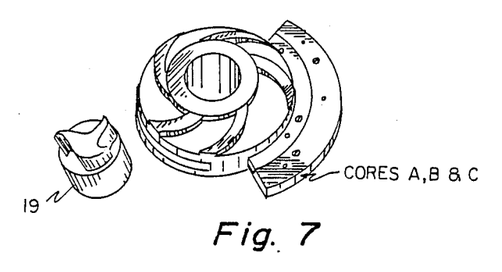
FIGS. 7, 8, 9 and 10 are perspective views of an impeller of the instant invention with vane core members illustrated in sequential steps of removal.
Figure 8:
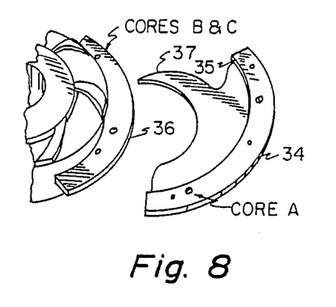

FIG. 7, is a perspective view of an elastomeric-coated impeller which has been molded and which has had the center core plug 19 removed. Also, two of the three vane passage core sub-assemblies have been removed. In molding a complete impeller with three vanes, and three vane passages, three vane core sub-assemblies similar to the sub-assembly shown in FIGS. 7 through 10 and 14–22 are utilized so that four vanes are formed and four vane core passages are formed in the impeller. In FIG. 7, cores A, B and C are still positioned within the impeller. in FIG. 8, vane core A has been removed. Core A has a rim 34, which is substantially as thick at its outer edge as the vane passage of the impeller. A third of the circle arc-like shoulder 35 is formed in the rim 34, said shoulder having a thickness substantially the same as the thickness of the rim 36 of vane core "B". Thus, vane core "A" and vane core "B" mate in concentric fashion as well as in a planar fashion where the tongue 37 of vane core A extends into the vane core passage.

Figure 9:
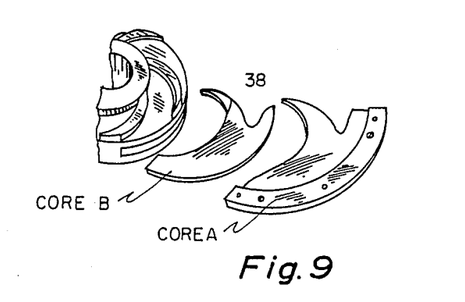

In FIG. 9, vane core B is shown after it has been removed from the impeller. Vane core B has an outer rim 36 which is a third of a circle in its arc and mates with the quarter-circle shoulder 35 of vane core A. Vane core "B" has a tongue 38, which extends into the vane core passage. The edge surfaces of tongues 37 and 38 are illustrated in FIG. 5 and the tongues have a width, $W_A$ and $W_B$, as indicated in FIG. 5.

Figure 10:
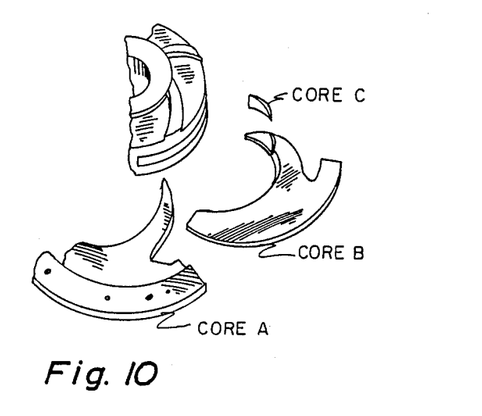

FIG. 10 shows vane core C removed from the impeller. The substantially crescent-shaped vane core C is illustrated.

It is apparent from FIG. 7 through 10, that similar vane core elements could be utilized to form any number of vane passages and vanes in an enclosed shrouded impeller. For example, an impeller could be formed having three, five, six, or any number of vanes and vane passages in which the rim portions of the cores A and B, respectively, would be one-third, one-fifth and one-sixth of a complete circle.

Figure 12:
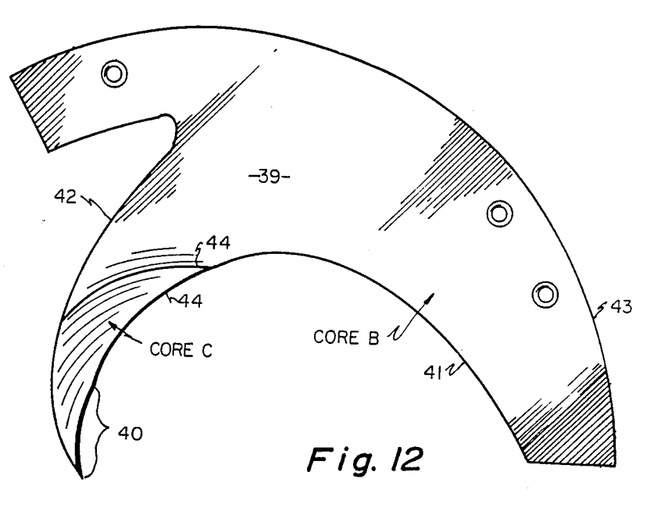
FIG. 12 is an elevational, facial view of a vane core element of the instant invention.

A facial view of core elements B and C is presented in FIG. 12. Core B and core A substantially have the same overall shape, i.e. core B may set in with core A. The flat, planar surfaces of core A are parallel to one another while core B has one flat planar surface which mates with a flat planar surface of core A. The other facial surface is a curved surface such that the width between opposed faces of the tongue increases with distance from the rim. The sweep of surface is such that it continues with the surface of core C.

That edge of core C designated by the numeral 40 is that portion which mates with the center cylindrical plug of the mold. Edge 41 of the tongue of core B forms one surface of a vane while edge 42 forms a surface of an adjacent vane. The space occupied by the tongues of core B and core C between adjacent vanes is a vane passage.

Figure 13:
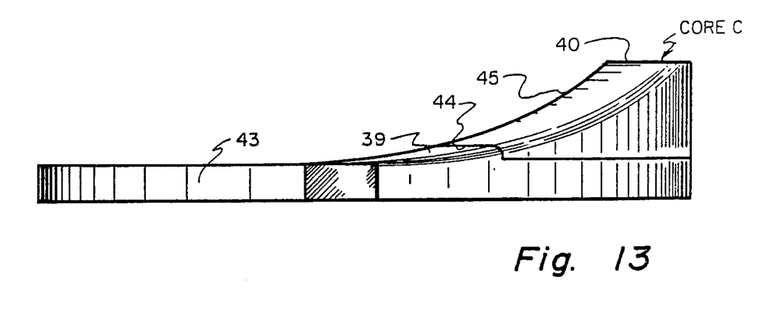
FIG. 13 is a plan view of the peripheral edge of the vane core elements of FIG. 12.
Figure 14:
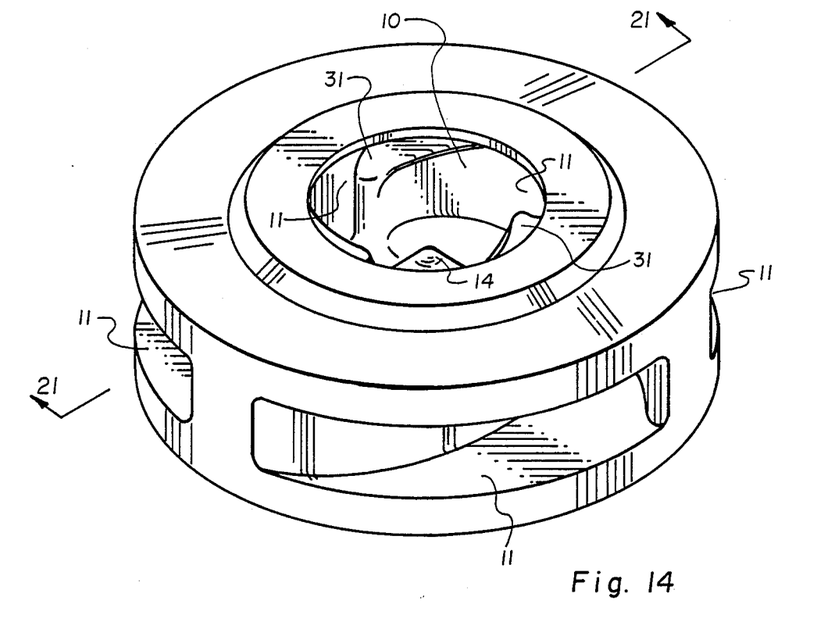
FIG. 14 is a perspective view of an impeller of this invention.
Figure 15:
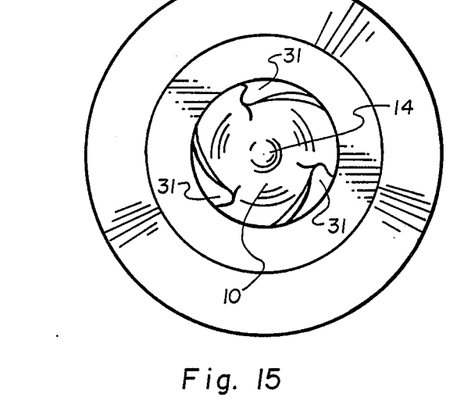
FIG. 15 is a top view of the impeller shown in FIG. 14.
Figure 16:
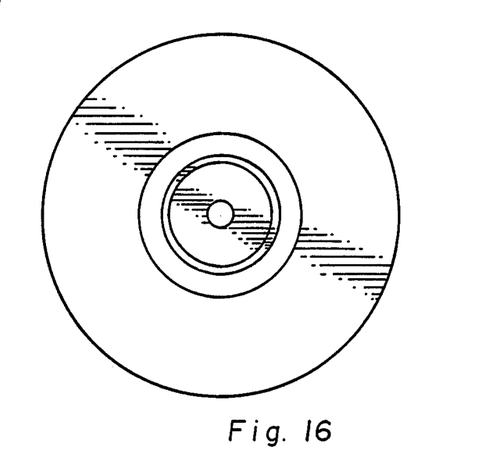
FIG. 16 is a bottom view of the impeller shown in FIG. 14.
Figure 17:
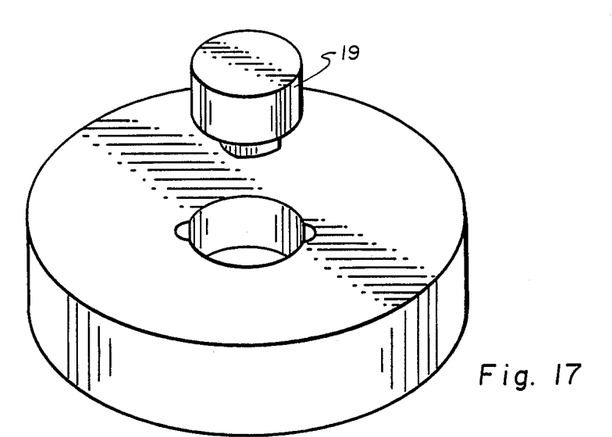
FIG. 17 is an exploded view of an impeller mold casing having a vane core assembly of this invention positioned therein.
Figure 18:
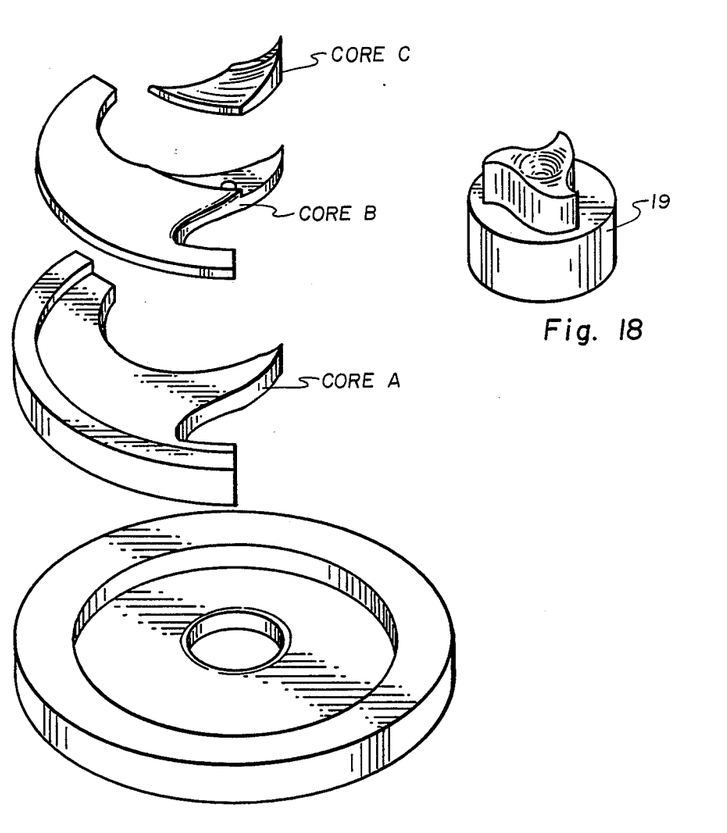
FIG. 18 is a perspective view of an impeller inlet core plug.
Figure 19:
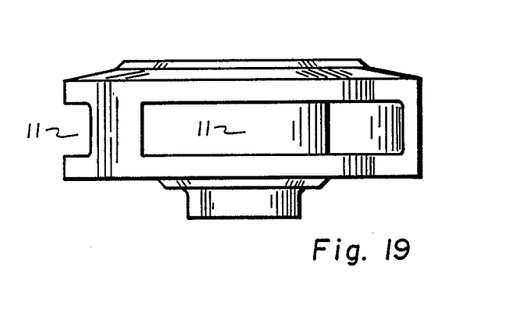
FIG. 19 is a side view of the impeller shown in FIG. 14.
Figure 20:
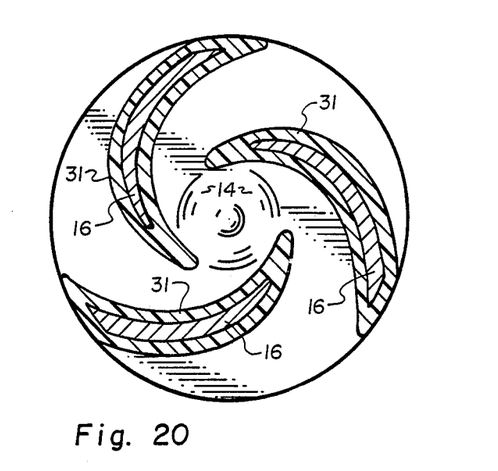
FIG. 20 is a cross-sectional view of the impeller shown in FIG. 14 taken along section lines 20—20.
Figure 21:
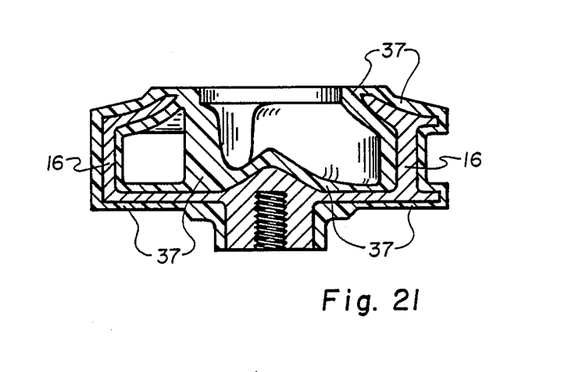
FIG. 21 is a cross-sectional view of the impeller of FIG. 14 taken along section lines 21—21.
Figure 22:
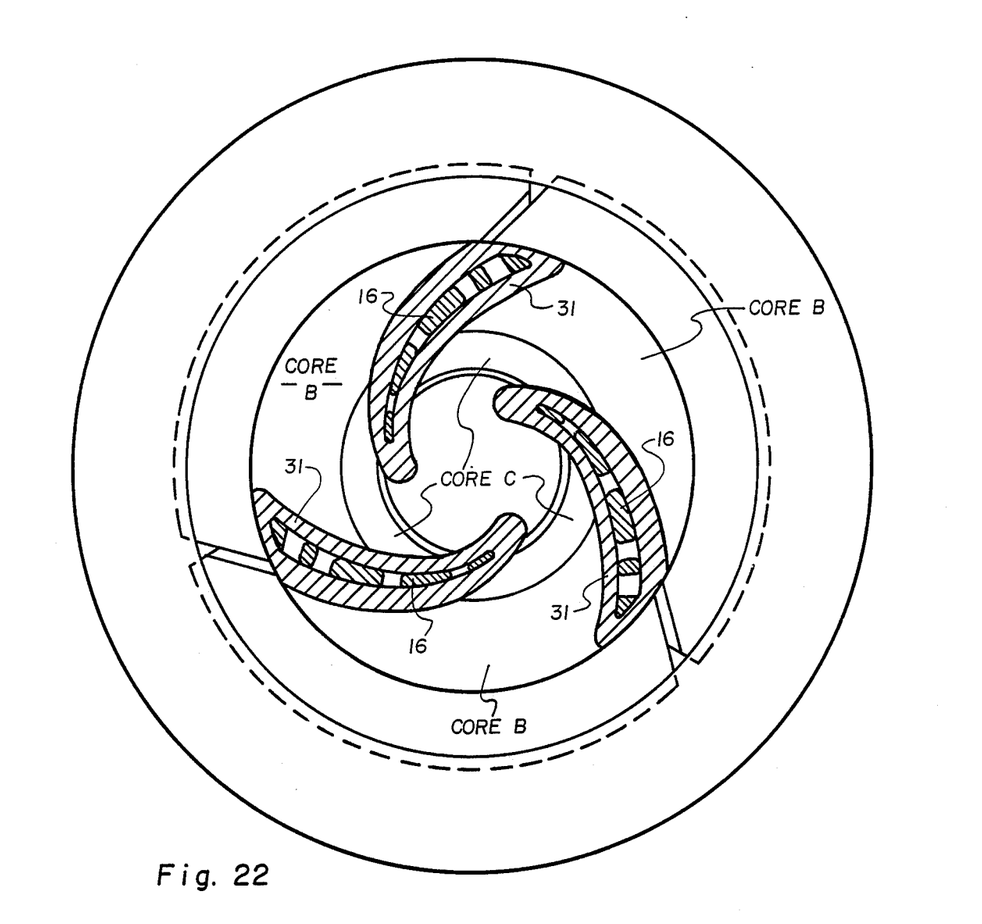
FIG. 22 is a cross-sectional view of a mold casing having three vane core assemblies of this invention and an impeller skeleton positioned therein.
Figure 23:
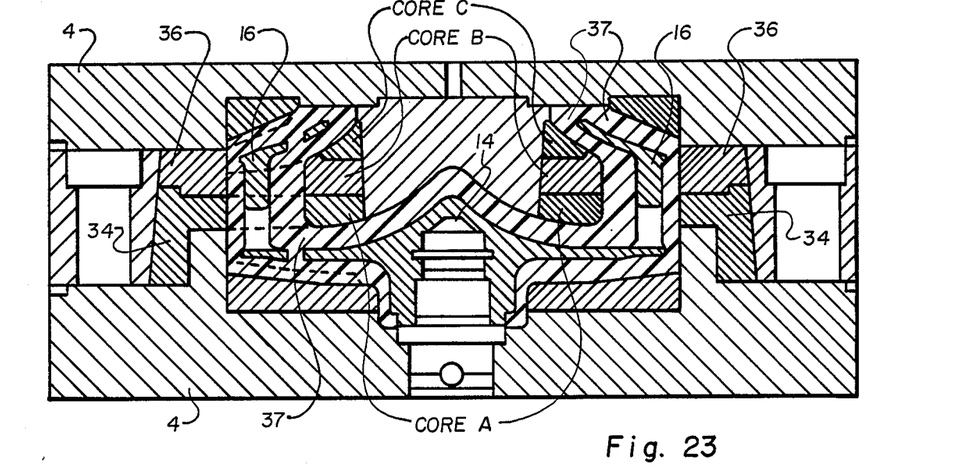
FIG. 23 is a cross-sectional view of the mold casing shown in FIG. 17, taken along section lines 23—23.

The view in FIG. 13 is an edge-on, rim view of cores B and C illustrated in FIG. 12. The outer edge 43 of the rim has a certain width, which is the width also of the tongue member adjacent the rim. The tongue of core B increases in thickness with distance from the rim, as illustrated in FIG. 13. The joint 44 between core C and core B is at the shoulder joint between these two elements. The offset of the shoulder is about the same as the increase in thickness of the tongue of core B from the rim to the shoulder. Thus, surfaces 40 and 45 are part of core C. The depth of the shoulder 44 and thickness of core B may be viewed in FIG. 5. The thickness of edge 40 at its junction with shoulder 44 is about the same as the thickness of edge 41 at its juncture with shoulder 44. The mating surfaces between cores C and B are flat, planar surfaces which have a substantially crescent-shaped outline.

Figure 11:
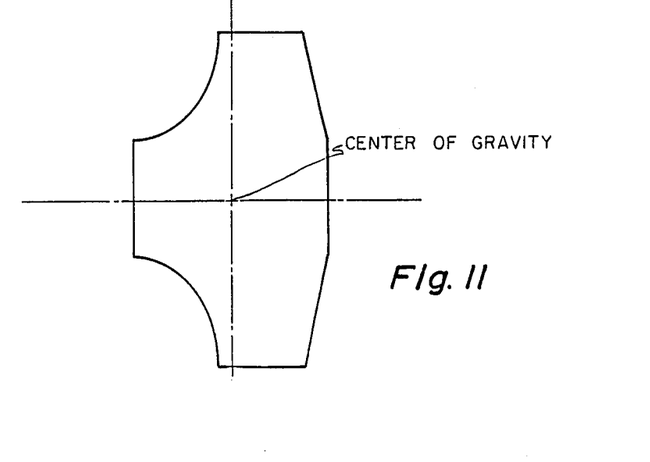
FIG. 11 is an elevational view of the peripheral surface of an elastomeric-covered impeller of the instant invention.

In FIG. 11 an edge-on elevational view of an impeller of the invention is illustrated. The center of gravity of the impeller is shifted towards the inlet opening. A consequence of the increased width of the impeller and the shift in the center of gravity is to position the center of gravity farther from the external bearing supporting the impeller shaft. Also, because of the greater cantilever effects of the impeller upon the bearing, a larger shaft and bearing are generally required.

Elastomeric impellers of the type of the instant invention for a given diameter impeller will generally weigh more, assuming the same thickness of elastomeric covering, than conventional elastomeric prior art impellers. Such increase in weight further would require an increase in shaft and bearing size. Thus, increased shaft and bearing sizes requried for construction of this type may have lead those skilled in the art away from making impellers of the type of this invention.

It has been found, however, that the elastomeric-covered impellers of this invention provides a significant increase in hydraulic efficiency, a significant decrease in power consumption and improved impeller life when compared with prior art type impellers of similar diameters. Thus, a smaller diameter impeller of the instant invention may be effectively substituted for larger diameter impellers of the prior art type, so that no real increase in shaft size or bearing size actually occurs when determined by pump performance.

Molding of elastomeric-covered impellers is done under very high pressures, i.e. injection pressures of 1500 psi. to about 2000 psi, with internal mold pressure spikes of upwards of 5000 psi, to about 6000 psi. Such high pressures require mold elements which are particularly rugged, especially for vane core elements which, in the instant invention, are cantilevered from an external rim member.

Should deflection or displacement of any mold element occur, several adverse conditions may result, such as:

a. the hydraulic passageways may be distorted and less efficient than desired;

b. the thickness of rubber deposited in a particular area may be less than desired, thereby diminishing the wear resistance life of the impeller and c. the balance and dynamics of the impeller may be adversely affected.

Because of these adverse consequences, the various mold elements must fit securely together and all elements must be sufficiently strong to resist any unbalance in pressure during the molding process.

Elastomeric-covered impellers of this invention have pumping efficiencies which are significantly improved over previous configurations of elastomeric-covered impellers. For example, small diameter impellers of from about six inches to twelve inches diameter show improvements of about 30% in pump efficiency when compared to other similarly sized pumps with configurations such as those shown in FIGS. 1 and 2.

Another measurement of improvement for the pumps of the instant invention is that power requirements to pump a certain volumetric rate of liquid to a certain head is accomplished with significantly less power consumption.

I claim:

1. A closed shrouded impeller comprising:

a pair of elastomeric-covered, disk-like shrouds; said shrouds being denominated a forward shroud and a rear shroud; said forward shroud having a thickness; said shrouds being positioned spacedly apart from one another and parallel to each other;

a plurality of elastomeric-covered upstanding vanes positioned between said pair of shrouds and mounted to each said shroud respectively; each of said vanes being configured in a radial, arc-like shape to extend from a central region of each said shroud, outward to a periphery of each shroud; each pair of adjacent vanes defining a vane passage there between having a peripheral outlet and a corresponding central inlet opening; said forward shroud defining a centrally positioned throat opening therein which extends through said thickness of said forward shroud; said throat opening communicating with each vane passage formed between said forward disk-like shroud and said rear disk-like shroud; said vanes extending into said throat opening; said throat opening being contiguous with each said central inlet opening, and communicating therewith, said rear shroud having a conical upstanding projection at its center which extends toward said forward shroud; said projection having a first longitudinal axis colinear with an axis of rotation of said rear shroud; said projection having an apex positioned elevationally below an upper surface of each of said vanes; said projection forming a curved channel to interconnect said inlet throat with said vane passages, said central inlet opening of each said vane passage being at least twice as wide as a width of a corresponding said vane passage peripheral outlet opening;

wherein said impeller operates to introduce an axial inlet flow through said throat to a right-angle peripheral flow within said impeller with a minimum eddying effect.

2. The impeller of claim 1 wherein said impeller has a maximum diameter of about twelve inches.

3. The impeller of claim 1 wherein the distance between said elastomeric covered shrouds at said periphery outlets of said vane passage is no greater than about twelve inches.

4. The impeller of the claim 1 wherein a maximum width of each said central inlet opening of each of said vane passages adjacent said throat inlet, as measured from an interior face of the front shroud, contiguous said inlet opening, to a plane extended from that portion of an interior face of said rear shroud which is perpendicular to the central axis of the pump, wherein such extended plane does not include any conical surface projection, is about 2.0 to about 2.2 times as great as a minimum width of said respective corresponding peripheral outlet of said vane passage as measured between the interior faces of opposed shrouds near the periphery of the impeller.

5. An impeller comprising:
- a pair of elastomer-coated, rigid, disk-like shrouds, one said shroud being designated a forward shroud and the other said shroud being designated a rear shroud; said shrouds being positioned spacedly apart and parallel to one another; said forward shroud defining a throat opening therein;
- a plurality of elastomer-coated vanes, positioned between said shrouds and mounted to each of said shrouds to extend between said shrouds and link said forward shroud to said rear shroud, each of said vanes extending from a central region of each said shroud outwardly toward a periphery of each said shroud, each pair of adjacent vanes defining a vane passage therebetween, each vane passage having an inlet opening proximate said central region and a corresponding outlet opening proximate said periphery; each said inlet opening and each said outlet opening having a width and a length;
- wherein the width of each said inlet opening is dimensionally twice the width of its corresponding outlet opening whereby an inlet flow of fluid introduced through said throat opening is directed to a right angle peripheral directed flow within said impeller with a minimum eddying effect.

6. The impeller according to claim 5 wherein the length of each said outlet opening is dimensionally larger than the length of its corresponding inlet opening.

7. The impeller according to claim 5 wherein a conical upstanding projection is mounted on said rear shroud proximate said central region of said rear shroud, said projection extending toward said front shroud, said projection having a first longitudinal axis which is colinear with an axis of rotation of said rear shroud, said projection having an apex positioned elevationally below an upper surface of each of said vanes, said projection communicating with said throat opening and said vane passages.

8. The impeller according to claim 5 wherein a maximum width of each said inlet opening of each said vane passage, as measured from an interior face of said front shroud contiguous said inlet opening, to a plane extended from that portion of an interior face of said rear shroud which is perpendicular to a central axis of said pump is between 2.0 to about 2.2 times as great as a minimum width of said respective peripheral outlet of said vane passage, as measured between said interior faces of said front and rear shrouds near said periphery of said impeller.

* * * * *